(12) United States Patent
Chen et al.

(10) Patent No.: US 9,974,096 B2
(45) Date of Patent: May 15, 2018

(54) METHOD FOR ASSISTING SCHEDULING OF A USER EQUIPMENT IN A HETEROGENEOUS NETWORK

(71) Applicant: TELEFONAKTIEBOLAGET L M ERICSSON (PUBL), Stockholm (SE)

(72) Inventors: Tsao-Tsen Chen, Täby (SE); Angelo Centonza, Winchester (GB); Mattias Frenne, Uppsala (SE); Lars Lindbom, Karlstad (SE); Gino Luca Masini, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 177 days.

(21) Appl. No.: 14/896,056

(22) PCT Filed: Jun. 17, 2013

(86) PCT No.: PCT/SE2013/050702
§ 371 (c)(1),
(2) Date: Dec. 4, 2015

(87) PCT Pub. No.: WO2014/204360
PCT Pub. Date: Dec. 24, 2014

(65) Prior Publication Data
US 2016/0128087 A1    May 5, 2016

(51) Int. Cl.
*H04W 72/12* (2009.01)
*H04W 28/18* (2009.01)
(Continued)

(52) U.S. Cl.
CPC ....... *H04W 72/1289* (2013.01); *H04W 16/32* (2013.01); *H04W 24/02* (2013.01);
(Continued)

(58) Field of Classification Search
CPC ..... H04W 16/32; H04W 24/02; H04W 28/18; H04W 72/0473; H04W 72/1289;
(Continued)

(56) References Cited

U.S. PATENT DOCUMENTS

2012/0113812 A1*  5/2012  Ji ................. H04W 72/1263
                                                    370/241
2012/0113844 A1*  5/2012  Krishnamurthy ..... H04L 1/0026
                                                    370/252
(Continued)

FOREIGN PATENT DOCUMENTS

CN    101827368 B    3/2013
EP    2451234 A2     5/2012
(Continued)

OTHER PUBLICATIONS

Notification of Transmittal of the International Search Report and Written Opinion dated Apr. 15, 2014, in International Application No. PCT/SE2013/050702, 17 pages.
(Continued)

*Primary Examiner* — Robert Lopata
(74) *Attorney, Agent, or Firm* — Sage Patent Group

(57) ABSTRACT

A method in a first base station for assisting a third base station in scheduling a user equipment. The first base station obtains a first parameter associated to a first cell, or an indication of the first parameter, and identifier of the first cell. The first parameter comprises a first protected subframe pattern. The first base station obtains a second parameter associated to a second cell, or indication of the second parameter, and an identifier of the second cell. The second parameter comprises a second protected subframe pattern. The first base station assists the third base station in scheduling of the user equipment in a third cell by sending to the third base station the first parameter, or the indication of the first parameter, and the identifier of the first cell, together (Continued)

with the second parameter, or the indication of the second parameter, and the identifier of the second cell.

25 Claims, 9 Drawing Sheets

(51) Int. Cl.
*H04W 16/32* (2009.01)
*H04W 24/02* (2009.01)
*H04W 72/04* (2009.01)
*H04W 84/04* (2009.01)

(52) U.S. Cl.
CPC ....... *H04W 28/18* (2013.01); *H04W 72/0473* (2013.01); *H04W 84/042* (2013.01)

(58) Field of Classification Search
CPC ... H04W 84/042; H04W 72/04; H04W 72/12; H04W 76/00; H04B 7/2121; H04B 7/2123; H04J 2203/0069; H04Q 2213/394
USPC ........................................................ 370/329
See application file for complete search history.

(56) References Cited

U.S. PATENT DOCUMENTS

| | | | | |
|---|---|---|---|---|
| 2013/0021929 A1* | 1/2013 | Kim | .................. | H04B 7/024 370/252 |
| 2013/0058234 A1* | 3/2013 | Yang | .................. | H04L 27/261 370/252 |
| 2013/0107798 A1 | 5/2013 | Gao et al. | | |
| 2013/0194950 A1* | 8/2013 | Haghighat | ............ | H04W 24/02 370/252 |
| 2013/0223271 A1* | 8/2013 | Huang | .................. | H04W 48/16 370/252 |
| 2013/0229940 A1* | 9/2013 | Baker | .................. | H04W 24/10 370/252 |
| 2013/0250882 A1* | 9/2013 | Dinan | ............... | H04W 72/0426 370/329 |
| 2014/0016598 A1* | 1/2014 | Kwon | .................. | H04L 5/0023 370/329 |
| 2014/0119334 A1* | 5/2014 | Kazmi | .................. | H04W 24/10 370/330 |
| 2014/0146770 A1* | 5/2014 | Iwai | .................. | H04B 1/715 370/329 |
| 2014/0204861 A1* | 7/2014 | Tie | .................. | H04W 52/24 370/329 |
| 2014/0211763 A1* | 7/2014 | Choi | .................. | H04W 36/20 370/332 |
| 2014/0254537 A1* | 9/2014 | Kim | .................. | H04J 11/005 370/329 |
| 2014/0286283 A1* | 9/2014 | Kim | .................. | H04J 11/005 370/329 |
| 2015/0029988 A1* | 1/2015 | Chai | .................. | H04W 72/0426 370/329 |
| 2015/0131553 A1* | 5/2015 | Centonza | ............. | H04L 5/0032 370/329 |
| 2015/0195113 A1* | 7/2015 | Kim | .................. | H04L 5/0091 370/329 |
| 2015/0249530 A1* | 9/2015 | Zhang | .................. | H04L 5/0058 370/329 |
| 2015/0282188 A1* | 10/2015 | Stanze | ................ | H04W 72/082 370/329 |
| 2015/0289141 A1* | 10/2015 | Ghasemzadeh | ....... | H04W 16/14 370/330 |
| 2015/0334689 A1* | 11/2015 | Nishio | .................. | H04L 5/0007 370/329 |
| 2016/0095030 A1* | 3/2016 | Lindoff | ................ | H04W 48/16 370/332 |

FOREIGN PATENT DOCUMENTS

| | | | |
|---|---|---|---|
| WO | 2009058087 A1 | 5/2009 | |
| WO | 2010087776 A1 | 8/2010 | |
| WO | 2012108640 A2 | 8/2012 | |
| WO | 2012122676 A1 | 9/2012 | |
| WO | WO 2014015504 A1 * | 1/2014 | ........ H04W 72/1231 |
| WO | WO 2014176147 A1 * | 10/2014 | ........ H04W 72/0426 |

OTHER PUBLICATIONS

Ying Wang et al. "RNTP-Based Resource Block Allocation in LTE Downlink Indoor Scenarios" Wireless Communications and Networking Conference (WCNC), 2013, IEEE, Apr. 7-10, 2013, pp. 3341-3345.
Lars Lindbom et al. "Enhanced Inter-cell Interference Coordination for Heterogeneous Networks in LTE-Advanced: A Survey" Cornell University Library, Dec. 7, 2011, 18 pages.
Klaus I. Pedersen et al. "eICIC Functionality and Performance for LTE HetNet Co-Channel Deployments" IEEE, 2012, 5 pages.
3GPP, 3rd Generation Partnership Project; Technical Specification Group Radio Access Network; Evolved Universal Terrestrial Radio Access Network (E-UTRAN); X2 application protocol (X2AP) (Release 11), 3GPP TS 36.423 V11.2.0, 2012, 136 pages.
Ericsson et al. "Details of almost blank subframes" 3GPP TSG-RAN WG1 #62bis, R1-105335, 2010, 6 pages.
Extended European Search Report dated Apr. 29, 2016, issued in European Patent Application No. 13887461.5, 9 pages.

* cited by examiner

METHOD FOR ASSISTING SCHEDULING OF A USER EQUIPMENT IN A HETEROGENEOUS NETWORK

CROSS REFERENCE TO RELATED APPLICATION(S)

This application is a 35 U.S.C. § 371 National Phase Entry Application from PCT/SE2013/050702, filed Jun. 17, 2013, designating the United States, the disclosure of which is incorporated herein in its entirety by reference.

TECHNICAL FIELD

Embodiments herein relate to a first base station, a third base station and methods therein. In particular, it relates to scheduling a user equipment in a heterogeneous cellular communications network.

BACKGROUND

In a typical cellular communications network, also referred to as a wireless communication system, user equipments communicate via a Radio Access Network (RAN) to one or more core networks.

A user equipment is a mobile terminal by which a subscriber can access services offered by an operator's core network. The user equipments may be for example communication devices such as mobile telephones, cellular telephones, laptops or tablet computers, sometimes referred to as surf plates, with wireless capability. The user equipments may be portable, pocket-storable, hand-held, computer-comprised, or vehicle-mounted mobile devices, enabled to communicate voice and/or data, via the radio access network, with another entity, such as another mobile station or a server.

User equipments are enabled to communicate wirelessly in the cellular communications network. The communication may be performed e.g. between two user equipments, between a user equipment and a regular telephone and/or between the user equipment and a server via the radio access network and possibly one or more core networks, comprised within the cellular network.

The cellular communications network covers a geographical area which is divided into cell areas, where radio coverage is provided by a base station at a base station site. wherein each cell area being served by a base station, A base station may be e.g. a Radio Base Station (RBS), which sometimes may be referred to as e.g. "NodeB", "B node", or Base Transceiver Station (BTS), depending on the technology and terminology used. In 3rd Generation Partnership Project (3GPP) Long Term Evolution (LTE), base stations may be referred to as eNodeBs or eN Bs. One base station, situated on the base station site, may serve one or several cells. Further, each base station may support one or several communication technologies. The base stations communicate over the air interface operating on radio frequencies with the user equipments within range of the base stations.

The base stations may be of different classes such as e.g. macro base stations, macro eNodeBs, home eNodeBs or pico base stations, based on transmission power and thereby also cell size.

In some radio access networks, several base stations may be connected, e.g. by landlines or microwave. Interfaces between base stations specifying how the base stations may communicate with each other using the connections have been specified, e.g. by 3GPP.

A heterogeneous network may be characterized as deployments with a mixture of cells of differently sized and overlapping coverage areas. Heterogeneous networks have recently attained large interest within the mobile cellular industry and are regarded by operators and many vendors as the deployment needed to meet high user experiences in mobile broadband. One example of such network is where pico cells are deployed within the coverage area of a macro cell. A pico cell is served by a small cellular base station transmitting with low output power and the pico cell typically covers a much smaller geographical area than a macro cell served by a macro base station. Note that the pico cells may also be placed on different floors in a high rise building. Another name for a pico cell is a Low Power Node (LPN).

Heterogeneous networks represent an alternative to densification of networks of macro cells, and have classically been considered in cellular networks with traffic hotspots as a deployment for increasing network capacity. In emerging mobile broadband applications, there is however a continuous demand for higher data rates and therefore it is of interest to deploy low power nodes not necessarily to cover traffic hotspots only but also at locations within the macro cell coverage where the signal-to-noise ratio prevents high data rates.

3GPP LTE radio access standard has been written in order to support high bitrates and low latency both for uplink and downlink traffic. All data transmission in LTE is controlled by the radio base station.

In the context of this disclosure the expression Down Link (DL) will be used for the transmission path from the base station to the user equipment. The expression UpLink (UL) will be used for the transmission path in the opposite direction i.e. from the user equipment to the base station. In the time domain, LTE downlink transmissions are organized into radio frames of 10 ms, each radio frame consisting of ten equally-sized subframes of 1 ms length.

SUMMARY

An object of embodiments herein is to provide a way of improving the performance of a heterogeneous cellular communications network.

According to a first aspect of embodiments herein, the object is achieved by a method in a first base station for assisting a third base station in scheduling of a user equipment in a heterogeneous cellular communications network. The heterogeneous cellular communications network comprises the first base station serving a first cell and a second base station serving a second cell. The first and the second cell are both at least partly overlapping with a third cell. The third cell is served by the third base station comprised in the heterogeneous cellular communications network. The first base station obtains a first parameter associated to the first cell or an indication of the first parameter, and an identifier of the first cell. The first parameter comprises a first protected subframe pattern related to the heterogeneous cellular communications network. The first base station further obtains a second parameter associated to the second cell, or an indication of the second parameter, and an identifier of the second cell. The second parameter comprises a second protected subframe pattern related to the heterogeneous cellular communications network. The first base station assists the third base station in scheduling of the user equipment by sending to the third base station:

the first parameter, or the indication of the first parameter, associated to the first cell and the identifier of the first cell, together with the second parameter, or the indication of the second parameter, associated to the second cell, and the identifier of the second cell.

According to a second aspect of embodiments herein, the object is achieved by a first base station for assisting a third base station in scheduling of a user equipment in a heterogeneous cellular communications network. The heterogeneous cellular communications network is adapted to comprise the first base station, which is operated to serve a first cell, a second base station, which is operated to serve a second cell, and a third base station operated to serve a third cell. The third cell is arranged to at least partly overlap with both the first cell and the second cell when the third cell is served by the third base station. The first base station comprises an obtaining circuit configured to obtain a first parameter associated to the first cell, or an indication of the first parameter, and an identifier of the first cell. The first parameter comprises a first protected subframe pattern related to the heterogeneous cellular communications network. The obtaining circuit is further configured to obtain a second parameter associated to the second cell, or an indication of the second parameter, and an identifier of the second cell, which second parameter comprises a second protected subframe pattern related to the heterogeneous cellular communications network. The first base station further comprises a sending circuit configured to assist the third base station in scheduling of the user equipment by sending to the third base station:

the first parameter, or the indication of the first parameter, associated to the first cell and the identifier of the first cell, together with the second parameter, or the indication of the second parameter, associated to the second cell, and the identifier of the second cell.

According to a third aspect of embodiments herein, the object is achieved by a method in a third base station for scheduling a user equipment in a heterogeneous cellular communications network. The heterogeneous cellular communications network further comprises a first base station serving a first cell and a second base station serving a second cell. The first and the second cell are both at least partly overlapping with a third cell served by the third base station comprised in the heterogeneous cellular communications network. The third base station receives from the first base station a first parameter, or an indication of the first parameter associated to the first cell, and an identifier of the first cell. The first parameter comprises a first protected subframe pattern related to the scheduling of the user equipment in the heterogeneous cellular communications network. Together with the first parameter, or the indication of the first parameter associated to the first cell, and the identifier of the first cell, the third base station receives from the first base station a second parameter, or an indication of the second parameter associated to the second cell, and an identifier of the second cell. The second parameter comprises a second protected subframe pattern related to the scheduling of the user equipment in the heterogeneous cellular communications network. The third base station further schedules the user equipment based on the first parameter, or on the indication of the first parameter, and on the identifier of the first cell and on the together received second parameter, or on the together received indication of the second parameter, and on the together received identifier of the second cell.

According to a fourth aspect of embodiments herein, the object is achieved by a third base station for scheduling a user equipment in a heterogeneous cellular communications network. The heterogeneous cellular communications network is adapted to comprise a first base station, which is operated to serve a first cell, a second base station, which is operated to serve a second cell, and the third base station operated to serve a third cell. The third cell when served by the third base station is arranged to at least partly overlap with both the first cell and the second cell. The third base station comprises a receiving circuit configured to receive from the first base station a first parameter or an indication of the first parameter associated to the first cell, and an identifier of the first cell. The first parameter comprises a first protected subframe pattern related to the scheduling of the user equipment in the heterogeneous cellular communications network. The receiving circuit is further configured to receive from the first base station a second parameter, or an indication of the second parameter associated to the second cell, and an identifier of the second cell, together with the first parameter, or the indication of the first parameter associated to the first cell, and the identifier of the first cell. The second parameter comprises a second protected subframe pattern related to the scheduling of the user equipment in the heterogeneous cellular communications network. The third base station further comprises a scheduling circuit configured to schedule the user equipment based on the first parameter, or on the indication of the first parameter, and on the identifier of the first cell and on the together received second parameter, or on the together received indication of the second parameter, and on the together received identifier of the second cell.

Since the first base station not only sends the first parameter associated to the first base station but also sends the second parameter associated to the second base station, on behalf of the second base station, the first parameter and the second parameter may take effect simultaneously in the third cell served by the third base station. Thus synchronization problems may be avoided. In this way the performance of the heterogeneous cellular communications network is improved.

BRIEF DESCRIPTION OF THE DRAWINGS

Examples of embodiments herein are described in more detail with reference to attached drawings in which.

DETAILED DESCRIPTION

Figure 1:
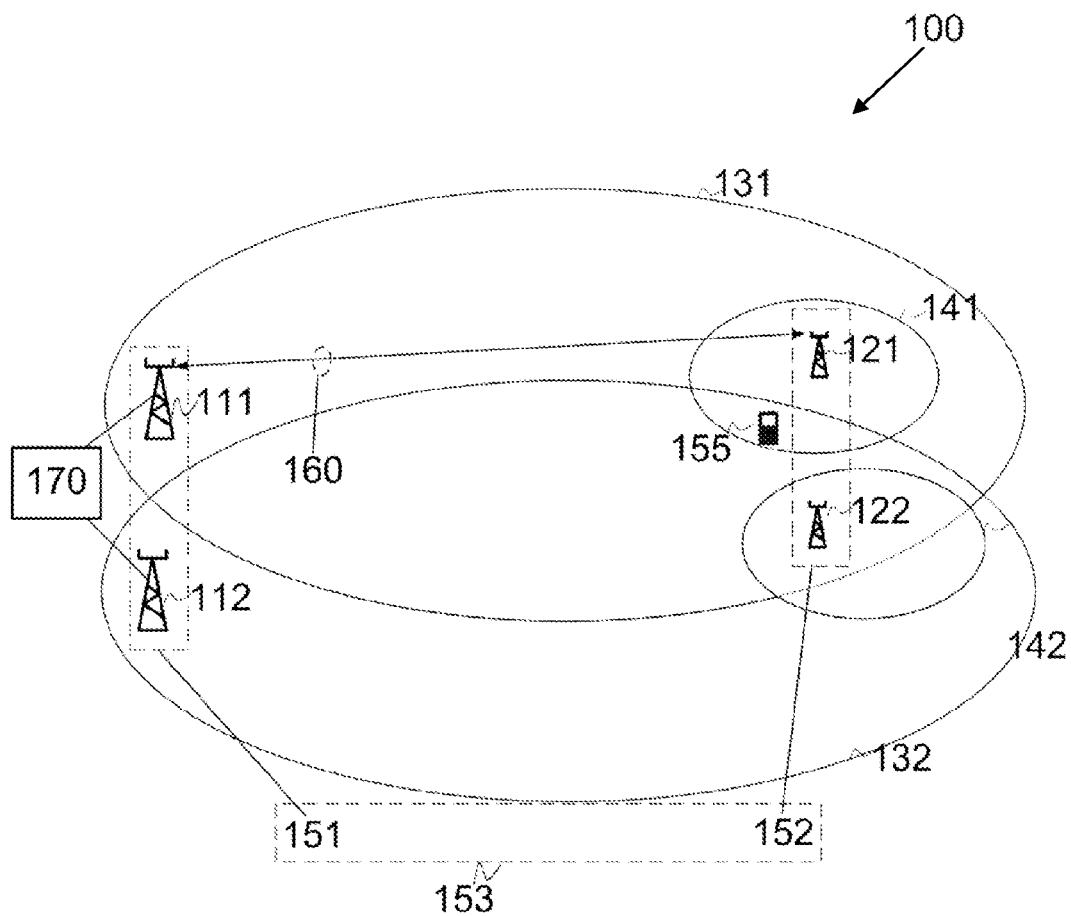
FIG. 1 is a schematic block diagram illustrating some embodiments of a heterogeneous cellular communications network.

As part of developing embodiments herein, a problem will first be identified and discussed below.

In a network with many low power base stations, also sometimes referred to as LPNs or pico base stations or femto base stations, and multiple high power base stations, also known as macro nodes or macro base stations, a large number of signaling instances may need to take place between the macro nodes and the LPNs to exchange parameters related to the heterogeneous network, such as protected subframe patterns, for example using the X2 interface. Some signaling instances may have to take place sequentially, for example between one LPN and the involved macro nodes, which then may result in time delay and a possible synchronization problem when scheduling a UE.

Furthermore, it has been observed that gains can be achieved if the heterogeneous network related parameters, for example the protected subframe patterns, are adapted to the traffic load. To support this, signaling of the heterogeneous network related parameters between the base stations need to be updated frequently, as to adapt to the rapidly changing network load and to the specific load in the areas covered by the individual nodes. It is a problem how to support these updates efficiently and furthermore how to make the updates occur synchronously for all the base stations involved. LPNs that are connected with different types of backhaul, which are characterized by different bit rates and/or latency, may also make this problem worse.

A typical scenario is the coordination between outdoor macro nodes and LPNs inside buildings. This could for example be the case for a high rise building where each floor has an LPN and parts of the building are covered from the outside, from different angles, by different sets of macro nodes.

Embodiments herein address the problem of synchronization when scheduling a UE in a heterogeneous network and the problem of low efficiency related to signaling in a heterogeneous network. According to embodiments herein the object is achieved by letting one macro node, such as a first base station, coordinate the signaling of the parameters related to the heterogeneous network from several macro nodes, such as a first base station and a second base station, to one or more LPNs, such as a third base station by additionally including information of which macro nodes the sent parameter is associated to. The coordination of the signaling may for example take place over the X2 interface.

Embodiments herein thus allows one macro node, which may be referred to as an anchor node, to send the parameters related to the heterogeneous network on behalf of multiple macro nodes, which may be referred to as slave nodes, in order to have the heterogeneous network related parameters from all macro nodes involved in the coordination take effect simultaneously in one or more cells served by one or more LPNs involved in the coordination. Thereby synchronization problems are avoided.

Furthermore, if the sent parameters, e.g. the protected subframe patterns, are the same for all the macro nodes involved, then significant overhead reduction may be achieved on the interface between the high power base stations and the LPNs, for example on the X2 interface, and the interface becomes more efficient.

A further advantage of embodiments herein is that existing signaling can be used.

Embodiments herein are defined as a first base station, a third base station and methods therein which may be put into practice in the embodiments described below. Further, embodiments herein are described with some reference to 3GPP LTE but it should be noted that the embodiments may be applied also in other cellular communications networks such as, e.g. 3GPP UMTS.

To improve the possibility to schedule user equipment efficiently in a heterogeneous cellular communications network, embodiments herein provides a method to handle signaling of parameters related to the scheduling of user equipment, which parameters are associated to a multiple of cells. In particular, embodiments herein are targeting scenarios where a cluster of macro nodes are covering a large number of LPNs, in which scenarios signaling between the base stations could be excessive, especially when adaptive protected subframe pattern configurations are used. However, the method doesn't limit the usage to this case. Neither is the method limited to the typical case where pico cells are deployed within a macro cell.

FIG. 1 depicts a heterogeneous cellular communications network 100 in which embodiments herein may be implemented. The heterogeneous cellular communications network 100 may be for example an LTE or any other 3GPP cellular network.

The heterogeneous cellular communications network 100 comprises a first base station 111, a second base station 112 and a third base stations 121. The communications network 100 may further comprise a further third base station 122. The base station 111 serves a first cell 131, the second base station 112 serves a second cell 132, while the third base station 121 serves a third cell 141. The further third base station 122 may serve a further third cell 142. The first cell 131 and the second cell 132 are both at least partly overlapping with the third cell 141 served by the third base station 121.

The first base station 111, the second base station 112 and the third base station 121 may each be e.g. Radio Base Stations (RBS), which sometimes may be referred to as e.g. "eNodeB", "nodeB", or Base Transceiver Station (BTS), depending on the technology and terminology used. The base stations may be of different classes such as e.g. macro NodeBs, home NodeBs or Pico base stations, based on transmission power and thereby also on cell size. In this example, the first base station 111 and the second base station 112 may be macro base stations having a higher transmission power than the third base station 121, which may be an LPN or a pico base station. Naturally, there may be more cells and more base stations in the heterogeneous cellular communications network 100, which cells and base stations are not shown in FIG. 1. For example, the first base station 111 and the second base station 112 may be serving more than one cell each, where each of the cells served by the first and the second base stations 111, 112 may be overlapping with a multiple of third cells 141, 142.

In order to facilitate the assisting of the scheduling of user equipment in the third cells 141, 142 the first base station 111 and the second base station 112 may be treated as a first group of base stations 151. Likewise a multiple of third base stations 121, 122 may be treated as a second group 152 of base stations. A combination of the first group 151 and the second group 152 of base stations may be treated as a third group 153 of base stations. Grouping of base stations and/or cells may for example be beneficial when the signaled parameters are associated to or are to be taken into account in a multiple of cells. Naturally, there may be more than one first group 151 of base stations and more than one second group 152 of base stations in the heterogeneous cellular communications network 100. This will be explained more in detail below.

A user equipment 155 is located in the third cell 141, which is its serving cell. Since the first and second base stations 111, 112 have a higher transmission power than the third base station 121 the first and second base stations 111, 112 may be interfering the transmissions of the third base station 121 to the user equipment 155. Therefore the interfering first base station 111 transmits data channels with reduced power to a user equipment served by the first cell 131 and the second base station 112 transmits data channels with reduced power to a user equipment served by the second cell 132 in certain subframes, referred to as protected subframes, in order to create protected radio resources for the third cell 141. The protected subframes may for example be Almost Blank Subframes (ABS) or Reduced Power Subframes (RPS). The first base station 111 indicates to the third base station 121 in which subframes the first base station 111 and the second base station 112 intend to transmit data channels with reduced power in the first and the second cell 131, 132. The third base station 121 may then take this information into account when scheduling the DL transmission for the user equipment 155 operating within an area with appreciable interference from the first base station 111 and/or from the second base station 112, such as in a Cell Range Expansion (CRE) zone. The user equipment 155 is prioritized to be scheduled in the protected subframes, i.e. in the subframes with low interference. Time domain Inter-Cell Interference Coordination (ICIC) assumes that the third cell 141 is time synchronized to the first and the second cell 131, 132, as a prerequisite for creating the protected subframes. In order for the third cell 141 to be time synchronized to the first and the second cell 131, 132 the first base station 111 assists the third base station 121 in scheduling DL transmission for the user equipment 155 by handling the signaling of the parameters related to scheduling from not only the first base station 111 but also from the second base station 112.

The heterogeneous cellular communications network 100 may further comprise an interface 160, such as an X2 interface, between the first base station 111 and the third base station 121. Further, the network 100 may comprise an interface between each pair of base stations, which interface is not shown in FIG. 1. The interface provides means for coordination of the network. The interface may be provided via land lines, radio link or a combination thereof.

The heterogeneous cellular communications network 100 may further comprise a central processing node 170, such as an operations and maintenance central. The central processing node 170 may for example store information about the heterogeneous cellular communications network 100. The central processing node 170 may also configure the first base station 111 and may select parameters related to the heterogeneous cellular communications network 100.

Figure 2:
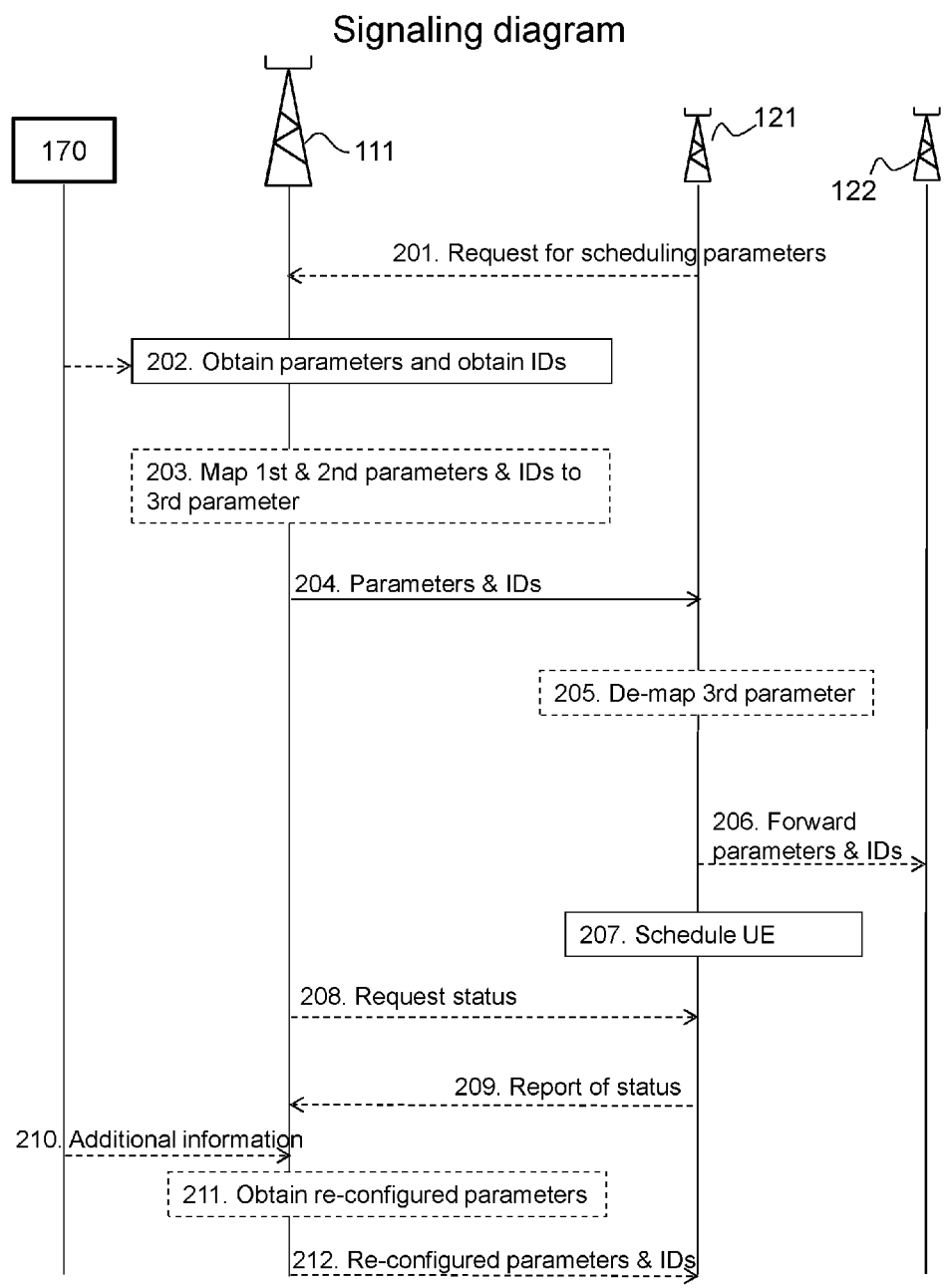
FIG. 2 is a schematic combined flowchart and signaling scheme of embodiments of a heterogeneous cellular communications network.

Actions for assisting in scheduling of the user equipment 155 in the heterogeneous cellular communications network 100 will now be described with reference to FIG. 2. As mentioned above the user equipment 155 is located in the third cell 141 served by the third base station 121. The third cell 141 is at least partly overlapping with the first cell 131, served by the first base station 111, and with the second cell 132, served by the second base station 112. The first base station 111 and the third base station 121 may communicate with each other over the interface 160. The heterogeneous cellular communications network 100 may further comprise the central processing node 170.

The actions do not have to be performed in the order stated below, but may be taken in any suitable order. Further, actions may be combined.

Action 201

The user equipment 155 may measure a stronger received signal power, e.g. in the form of a measured Reference Signal Received Power (RSRP), from the first base station 111 and the second base station 112 than from the third base station 121. The third base station 121 needs to know in which subframes the respective first and second base stations 111, 112 intend to transmit data channels with reduced power in the respective first and the second cell 131, 132. Therefore the third base station 121 may send a request for a first parameter associated to the first cell 131 and for a second parameter associated to the second cell 132. Such a request may be a request for the respective protected subframe pattern used in the respective first and second cell 131, 132. Such a request may for example include an Invoke Indication Information Element (IE) in LTE. The Invoke Indication IE may be sent in a Load Information message in LTE. The requested respective parameters used in the respective first and second cell 131, 132 may comprise different content, but they may also comprise the same content, depending on the actual situation. The parameters used in the first cell 131 and in the second cell 132 may also vary over time, e.g. to meet a varying traffic situation.

Action 202

In order for the first base station 111 to be able to assist the third base station 121 in the scheduling of the user equipment, the first base station 111 obtains a first parameter associated to the first cell 131. The first parameter comprises a first protected subframe pattern related to the heterogeneous cellular communications network 100. The first base station 111 further obtains an identifier of the first cell 131. The identifier of the first cell 131 will make it possible for the third base station 121 to identify the first cell 131 in which the first parameter is valid. In the cases where the first base station 111 serves more than one cell that are overlapping with the third cell 141 the first parameter may comprise parameters for multiple cells that are overlapping with the third cell 141.

The first base station 111 further obtains a second parameter associated to the second cell 132. The second parameter comprises a second protected subframe pattern related to the heterogeneous cellular communications network 100. The first base station 111 further obtains an identifier of the second cell 132. The identifier of the second cell 132 makes it possible for the third base station 121 to identify the second cell 132 in which the second parameter is valid. In the cases where the second base station 112 serves more than one cell that are overlapping with the third cell 141 the second parameter may comprise parameters for multiple cells that are overlapping with the third cell 141.

The identifier of the cell may for example be an Eutran Cell Global ID (ECGI) which uniquely defines a cell and a base station in LTE.

How the first base station 111 may obtain the second parameter and the second identifier will be explained below.

Instead of obtaining the first parameter itself an indication of the first parameter may be obtained. Likewise, instead of obtaining the second parameter itself an indication of the second parameter may be obtained. This could for example be beneficial when only a small part of the available parameter space, such as the available protected subframe patterns, is actually used by the first and the second cells 111, 112. For example, a protected subframe pattern, such as an ABS pattern, comprising 40 bits is used in the respective first and second cell 131, 132. Thus, the number of available protected subframe patterns is $2^{40}$. However, only $2^6$ of the available patterns may for example be used by the first and second base stations 111, 112. Considerable reduction of the overhead may then be achieved if the 40 bit protected subframe patterns are represented by indications of the protected subframe pattern, which indications comprise less than 40 bits.

The first parameter and the second parameter may be represented by a common parameter which is associated to both the first and the second cell 131, 132. By representing the first and the second parameters by a common parameter significant overhead reduction may be achieved on the interface 160.

In some embodiments the common parameter comprises a common protected subframe pattern. The first base station 111 may obtain the common protected subframe by combining a first protected subframe pattern with a second protected subframe pattern which is different from the first protected subframe pattern. In the combined protected subframe pattern a subframe is protected only if it was protected in each of the original subframes.

Further, a common parameter may be beneficial when the first parameter associated to the first cell 131 is equivalent to the second parameter associated to the second cell 132.

The identifier of the first cell 131 and the identifier of the second cell 132 may be represented by a common identifier, in order to reduce overhead over the interface 160.

In some embodiments the first base station 111 obtains a second common identifier of a multiple of third cells, such as the third cell 141 and a further third cell 142. This may be the case when the first cell 111 is assisting several third cells 141, 142 with scheduling of user equipment. For example, in FIG. 1 both the first cell 131 and the second cell 132 are overlapping with both the third cells 141, 142.

As mentioned above usually only a small part of the available parameter space is used by the first and second base stations 111, 112. In order to reduce overhead on the interface 160 the indication of the common parameter may be represented by a binary vector. For example, only 64 protected subframe patterns may be used by the first and the second base stations 111, 112. Then the 64 protected subframe patterns may be represented by the 64 length-6 binary vectors: [0 0 0 0 0 0], [0 0 0 0 0 1], . . . , [1 1 1 1 1 0], [1 1 1 1 1 1].

In some embodiments the first base station 111 needs to synchronize the first and the second protected subframe pattern with each other in order for the first and the second protected subframe patterns to start at the same time in the first and the second cell 131, 132. Then the first parameter may further comprise an offset in a System Frame Number, SFN, for the first cell 131 with respect to a reference cell for the first and the second cell 131, 132 and the second parameter may further comprise the offset in the SFN for the second cell 132 with respect to the same reference cell. The reference cell may for example be the first cell 131. The first base station 111 may shift the second protected subframe pattern in the second cell 132 in time with the same number of frames as the offset in the SFN for the second cell 132.

The first parameter may further comprise a Relative Narrowband Tx Power, RNTP, indication for the first cell 131, and the second parameter may further comprise an RNTP indication for the second cell 132. The RNTP indication is an indication of the transmission power that a base station, e.g. the first base station 111, will use for each of the Physical Resource Blocks, PRBs, in a cell, e.g. the first cell 131. The RNTP indication may be comprised in an RNTP IE which may indicate whether the downlink Tx power for a certain resource block is lower than an indicated RNTP threshold. For example, the RNTP indication may be 0 or 1, depending on whether the transmission power for the PRB corresponding to the RNTP bit in a bitmap is above (value 1) or below (value 0) the RNTP threshold signaled as part of the RNTP IE. The third base station 121 may use this information when deciding on its scheduling policy.

In some embodiments the first parameter, or the indication of the first parameter, and/or the second parameter, or the indication of the second parameter, and/or the identifier of the first cell 131 and/or the identifier of the second cell 132 are obtained from the central processing node 170.

Action 203

As mentioned above, considerable reduction in overhead signaling may result from sending a respective indication of the respective first and/or second parameter instead of sending the parameter itself. For example, a 40-bit protected subframe pattern may be represented by an indication of the protected subframe pattern, which indication may comprise for example 6 bits. However, if the format for sending the parameter over the interface 160 is fixed, e.g. the 40-bit format is preferred to be used for sending an IE comprising the protected subframe pattern over the X2 interface, then it may be required that the respective first, second and common parameters have this fixed format. In order to be able to take advantage of any redundancy in the parameter space the first base station may map the indication of the common parameter and the common identifier of the first cell 131 and the second cell 132 to a third parameter, whereby the third parameter is an indication of both the indication of the common parameter and the common identifier of the first cell 131 and the second cell 132. Though extra encoder and decoder are needed in the first base station 111 and the third base station 121, mapping may have the advantage of enhanced error correction capability on top of that provided by the application protocol for the interface 160, e.g. the X2 application protocol. Additionally, information on which other macro base stations, e.g. the second base station 112, that are using the same parameters related to the heterogeneous network 100, may be sent to the third base station 121 via the redundancy of the 40 bits. No extra capacity, e.g. in the form of an extra IE, is needed for this purpose.

Action 204

The first base station 111 assists the third base station 121 in scheduling of the user equipment 155 by sending to the third base station 121 the first parameter or the indication of the first parameter, associated to the first cell 131 and the identifier of the first cell 131, together with the second parameter or the indication of the second parameter, associated to the second cell 132, and the identifier of the second cell 132. By sending the second parameter together with the first parameter the respective first and second parameter associated to the respective first and second cell 131, 132 may take effect simultaneously in the third cell 141. Thus synchronization problems due to a delay in the arrival time of one or more of the parameters may be avoided. By comprising information on which cell the parameter is associated to the third base station 121 knows which cell the sent parameter is valid for and may schedule the user equipment 155 accordingly.

The first and second parameters and the identifier of the first cell 131 and the identifier of the second cell 132 may for example be sent by modifying a LOAD INFORMATION message with for example an IE comprising the first and second parameters, e.g. an ABS Information IE, and an IE comprising the identifier of the second cell 132, e.g. the ECGI of the second cell 132. Such an IE comprising the identifier of the second cell 132 may for example be a Cell ID 2 IE. Thus, in addition to the identifier of the first cell 131, as required by the current specification, the first base station 111 signals the identifier of the second cell 132. The common parameter associated to both the first and the second cell 131, 132, the common identifier of the first and the second cell 131, 132 and the second common identifier of a multiple of third cells, such as the third cells 141, 142 may also be sent in a modified ABS Information IE.

In some other embodiments information concerning cells neighbouring to the first cell 131, such as the second cell 132, served by neighbouring base stations, such as the second base station 112, may be represented by a Neighbour Cell Information Item IE in the modified LOAD INFORMATION message. The Neighbour Cell Information Item IE may comprise a list of neighbouring cells together with parameters associated to the cells, such as an ABS Information IE and an RNTP IE.

The first parameter or the indication of the first parameter, and the identifier of the first cell 131, and the second parameter or the indication of the second parameter and the identifier of the second cell 132 may be sent to the third base station 121 over an X2 interface 160.

Action 205

In some embodiments where the indication of the common parameter and the common identifier of the first and the second cell 131, 132 have been mapped to a third parameter in order to reduce the traffic load on the interface 160, the third base station 121 de-maps the third parameter to the indication of the common parameter and to the common identifier of the first and the second cell 131, 132.

Action 206

In some embodiments there is not an interface between the first base station 111 and the further third base station 122. The third base station 121 may forward the first parameter, or the indication of the first parameter, and the identifier of the first cell 131 to the further third base station 122. Further, the third base station 121 may forward the second parameter, or the indication of the second parameter, and the identifier of the second cell 132 to the further third base station 122. The third base station 121 may forward the first parameter or the indication of the first parameter, and the identifier of the first cell 131 together with the second parameter, or the indication of the second parameter, and the identifier of the second cell 132 in order for the two parameters to take effect simultaneously in the further third base station 122.

Action 207

When the third base station 121 has received the respective parameter and the respective identifier associated to the respective first and the second cell 131, 132 the third base station 121 schedules the user equipment 155 based on the first parameter, or on the indication of the first parameter, and on the identifier of the first cell 131 and on the second parameter, or on the indication of the second parameter, and on the identifier of the second cell 132. Since the second parameter associated to the second cell 132 is received together with the first parameter associated with the first cell 131 the first and second parameters may take effect simultaneously in the third cell 141 served by the third base station 121. In this way, synchronization problems in the heterogeneous cellular network 100 may be avoided.

Action 208

In order for the first base station 111 to get feedback on how well the respective first and second protected subframes are used by the third base station 121 the first base station 111 may send a request to the third base station 121 for a status on the usage of the respective first and second protected subframes. Such a request may for example be implemented by a Resource Status Request in LTE. A low usage may be the result of strong interference from another base station using another protected subframe pattern or due to few user equipment in need for protected subframes. Further, the traffic situation may change rapidly. Since the request for the status on the usage is sent from only the first base station 111 and not also from the second base station 112 the traffic load on the interface between the second base station 112 and the third base station 121 may be reduced.

Action 209

The third base station 121 may report the status on the usage of the respective first and second protected subframes to the first base station 111 in response to the request sent in action 208. The reporting may be implemented by for example sending a Resource Status Update message including an ABS Status IE in LTE. The report may for example include an indication that parts of the respective first and/or second protected subframes are not usable, due to for example strong interference. The report may also include an indication of how much of the usable part of the respective first and second protected subframe pattern is actually used in the third cell 141.

Since the report of the status on the usage of the protected subframes is sent to only the first base station 111 and not also to the second base station 112 the traffic load on the interface between the second base station 112 and the third base station 121 may be reduced.

Action 210

In some embodiments the first base station 111 obtains an additional information complementing the status on the usage of the respective first and second protected subframes received from the third base station 121 in action 209. The central processing node 170 may send such complementing additional information to the first base station 111. E.g. in order to force a certain behavior for the third cell 141 an operator may choose to semi-statically configure some of the parameters signaled to the third base station 121, e.g. in the LOAD INFORMATION message. Further, the first base station 111 may obtain information on a cell utilization of the second base station 112. The cell utilization in the first and the second cell 131, 132 may be taken into account when deciding on the density of the protected subframe patterns for the first and the second cell 131, 132. In some embodiments the first base station 111 obtains the additional information from the second base station 112.

Action 211

This action is related to action 202. If the first parameter and/or the second parameter need to be changed in the light of the information obtained in action 209-210, then the first base station 111 may obtain a re-configured first parameter and/or a re-configured second parameter. The re-configuration may at least partly be based on the information obtained in action 209 and/or 210. In some embodiments the first base station 111 obtains the re-configured parameter from the central processing node 170.

In some other embodiments the first base station 111 re-configures the first parameter and/or the second parameter. The re-configured parameters may comprise the same content as the old parameters.

Action 212

When the first base station 111 has obtained the re-configured first parameter and/or the re-configured second parameter the first base station 111 may send the re-configured first and second parameters to the third base station 121 in the same way as in action 204.

Further Details Exemplified with the LTE Frequency Division Duplex (FDD) System

Figure 3:
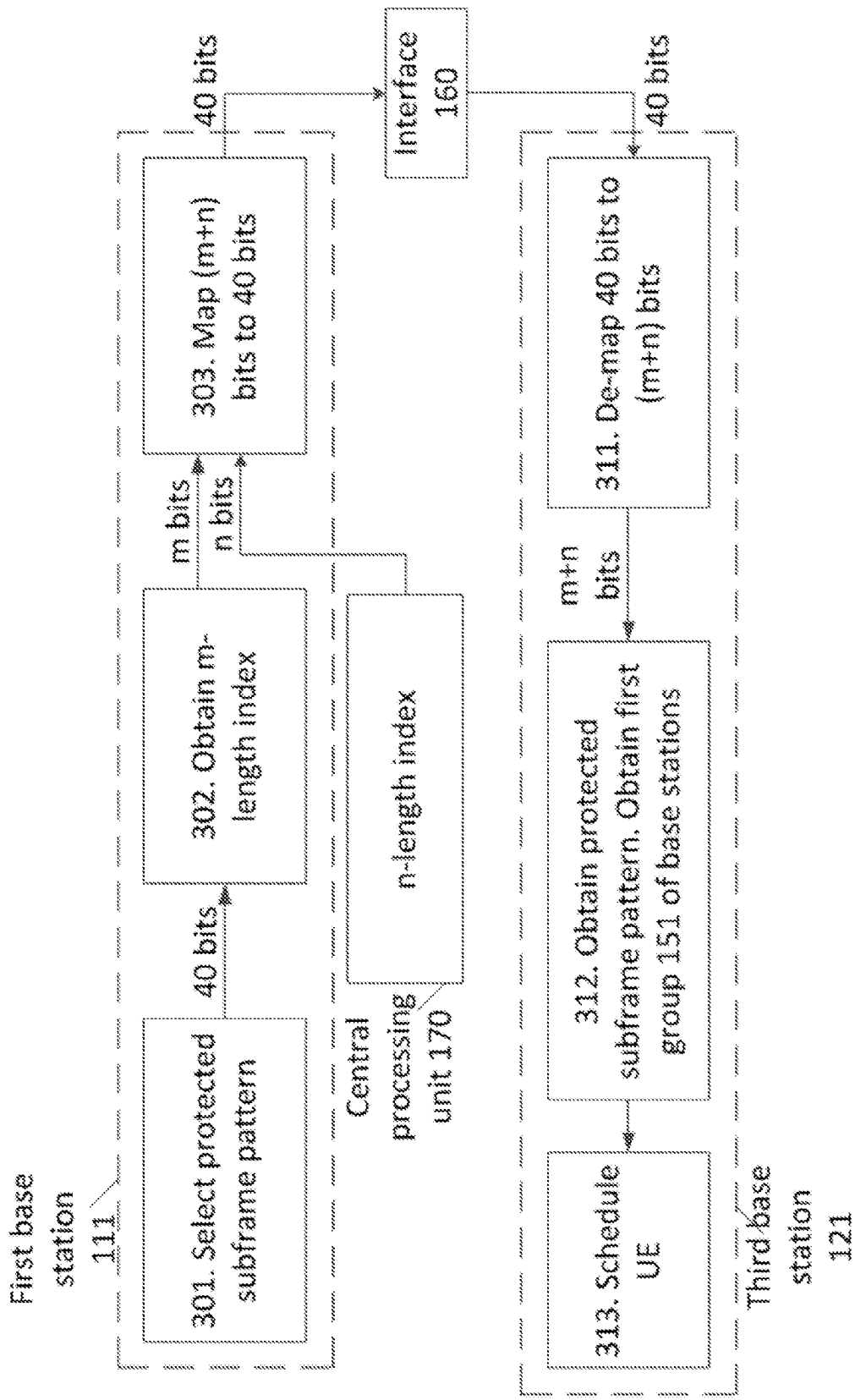
FIG. 3 is a schematic combined flowchart and block diagram illustrating embodiments of methods in a first base station and in a third base station.
Figure 4:
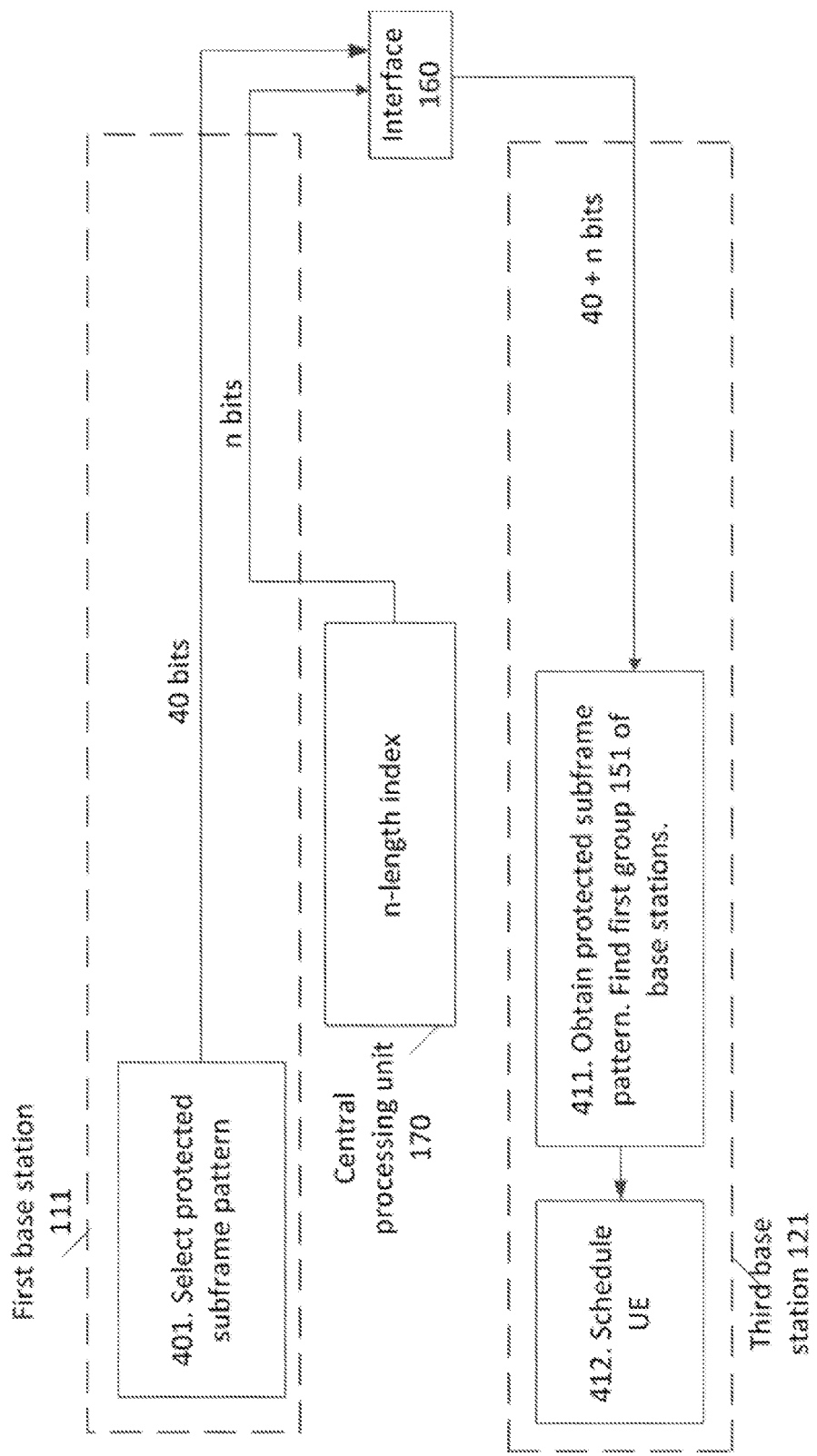
FIG. 4 is a schematic combined flowchart and block diagram illustrating embodiments of methods in a first base station and in a third base station.
Figure 5:
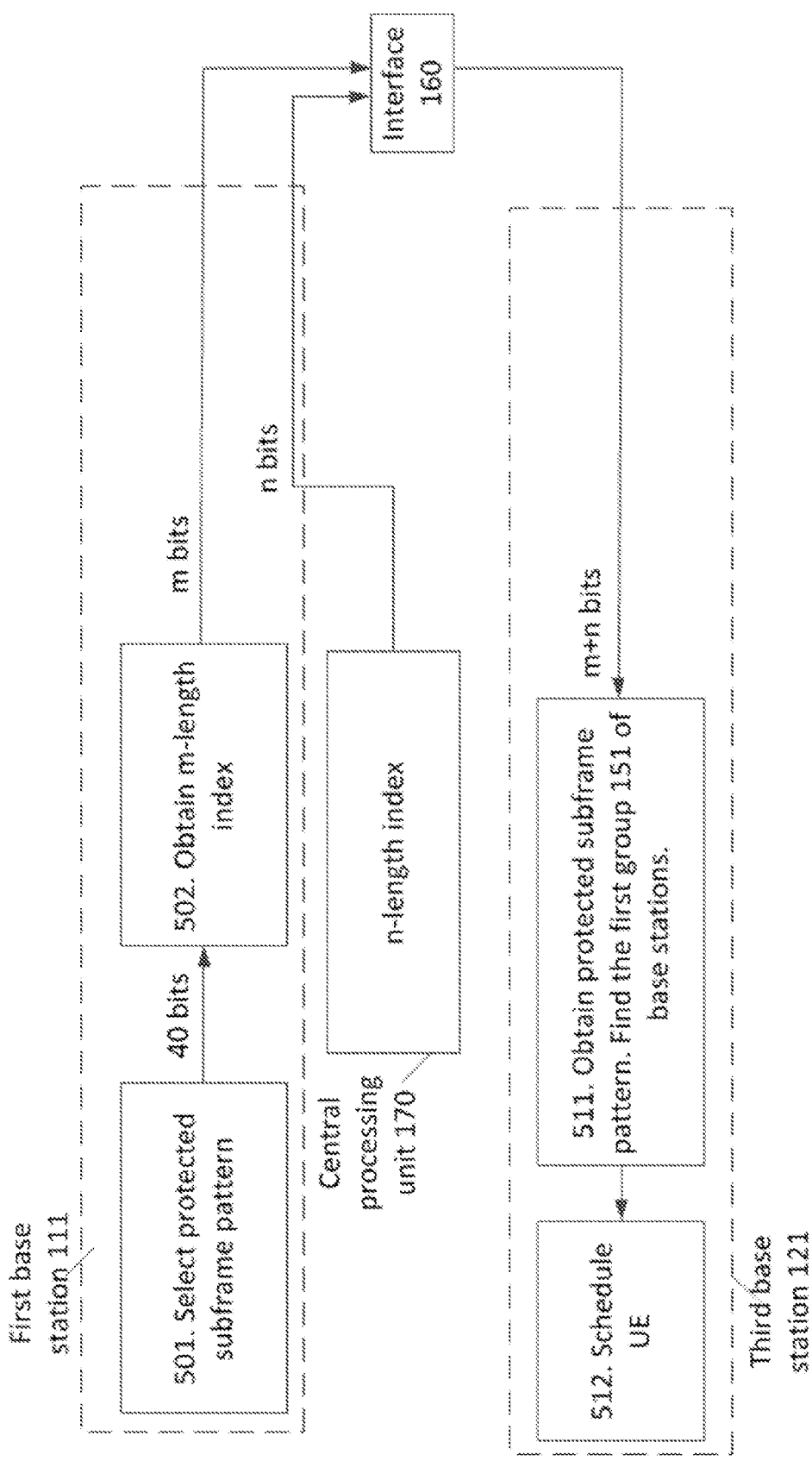
FIG. 5 is a schematic combined flowchart and block diagram illustrating embodiments of methods in a first base station and in a third base station.

Embodiments herein will now be described in more detail, applicable to any suitable embodiments above. The embodiments below target to reduce the overhead over the interface 160 even further and are schematically shown in FIG. 3, FIG. 4 and FIG. 5. Embodiments herein are further described assuming an LTE FDD system, but are equally applicable to any 3GPP system relying on FDD or Time Division Duplex (TDD). The periodicity of the protected subframe patterns used in the heterogeneous network 100 is assumed to be 40 subframes. That is, the protected subframe patterns comprise 40 bits. However, any periodicity is possible. Only a few of all the available $2^{40}$ protected subframe patterns are actually used in the heterogeneous network 100. Embodiments herein are further described by a multiple of first base stations 111 and a multiple of second base stations 112. Similarly there are a multiple of first cells 131 and a multiple of second cells 132. The first and the second base stations 111, 112 are comprised in several first groups 151 of base stations. Similarly there are a multiple of third base stations 121, 122 and a multiple of third cells 141, 142. The third base stations 121, 122 are comprised in a multiple of second groups 152 of base stations. As mentioned above the respective first and second base stations 111, 112 may be macro base stations having a higher transmission power than the third base stations 121, 122, which may be LPNs or pico base stations.

It is assumed that each first and second base station 111, 112 will be involved in a limited number of first groups 151 of base stations. Then an index of the first group 151 of base stations may be used as the common identifier mentioned in action 202, instead of for example the ECGI as the identifier of the respective first and second base stations 111, 112. The index may be a binary vector of length n. The index may also comprise an identifier for the second group 152 of base stations. In this way the first base station 111 knows to which third base stations, e.g. the third base station 121, it should send the parameters when the first base station 111 obtains an index representing both the first group 151 and the second group 152 of base stations from the central processing node 170.

Assume only $2^m$ possible protected subframe patterns are selected 301, 401, 501 by all first and second base stations 111, 112. A set with $2^m$ 40-bit protected subframe patterns may be called a protected subframe pattern set. The first base station 111 may obtain 302, 502 a length-m vector corresponding to the selected protected subframe pattern. Instructions on how to map between the length-m binary vectors and the 40-bit protected subframe patterns mentioned in action 203 may be defined by the central processing node 170, e.g. by the operations and maintenance central, and sent to the first base stations 111. The mapping instructions for the protected subframe patterns will not be updated frequently.

As mentioned above in relation to FIG. 1 the third group 153 of base stations comprises the first group 151 of base stations and the second group 152 of base stations. It is also assumed that the same protected subframe pattern is used by the first group 151 of base stations by either assuming that all SFN offsets are zero or that the protected subframe pattern is aligned within the first group 151 of base stations.

It is assumed that there are $N_i$ possible third groups 153 of base stations for which the first base station 111 is involved in assisting in the scheduling of user equipment in the third cells 141, 142. Assume $n_i$ is the smallest integer such that $2^{n_i} \geq N_i$. Then the $N_i$ third groups 153 of base stations associated with the first base station 111 can be represented by the $2^{n_i}$ length-$n_i$ binary vectors. As seen in FIG. 3 the central processing node 170, e.g. the operations and maintenance central may provide the length-$n_i$ binary vectors to the first base station 111. Instructions on how to map between the length-$n_i$ binary vectors and the $N_i$ third groups 153 of base stations associated to each macro base station may also be defined by the central processing node 170, e.g. the operations and maintenance central. The mapping instructions for the third groups 153 of base stations will not be updated frequently. Since the base stations 111, 112 in the first group 151 of base stations may have different values of $n_i$ a common value equal to the maximum value of the $n_i$:s may be used for all the base stations in the first group 151 of base stations to simplify the encoding and decoding operations described below.

For example, in some embodiments the first base station 111 is involved in assisting the scheduling of user equipment in three third groups 153 of base stations. Then the three third groups 153 of base stations associated to the first base station 111 may be represented by [0 0], [0 1] and [1 0], respectively.

In some other embodiments the second base station 112 is the base station assisting the third base station 121 in scheduling of the user equipment 155. The second base station 112 is involved in assisting the scheduling of user equipment in five third groups 153 of base stations. Then the five third groups 153 of base stations associated with the second base station 112 may be represented by [0 0 0], [0 0 1], [0 1 0], [0 1 1] and [1 0 0], respectively.

If the first base station 111 is selected, e.g. by the central processing node 170, to assist the third base station 121 in scheduling of the user equipment 155, the n-bit index may be [0 1]. From this example, the first base station 111 may be preferred over the second base station 112 as the base station assisting the third base station 121, since only a 2-bit index is needed, when compared to the 3-bit index needed when the second base station 112 is the assisting base station. However, other factors may be taken into account when deciding which macro base station shall be the assisting base station. For example, if the current load for the first base station is much higher than the load of the second base station over the interface 160, which may be an X2 interface, the second base station 112 may be selected as the assisting base station instead. Also, if the interface 160 between the second base station 112 and the third base station 121 has higher capacity or shorter delay than the interface 160 between the first base station 111 and the third base station 121, the second base station 112 may be preferred as the assisting base station.

The mapping function 303 in FIG. 3 transforming (m+n) bits to 40 bits may be any one-to-one mapping function, where n=$n_i$ or n=max($n_i$). In some further embodiments, for efficient de-mapping (decoding) and better error correction capability, an error correction code may be used as the mapping function. For example, if m=6 and n=4, a tail-biting convolutional code with rate 1/4, generator polynomial (27, 47, 57, 61), and payload 10 bits may be used, which is equivalent to a (40,10) linear block code. If n is a variable, i.e. n=$n_i$ for different macros, tail-biting convolutional code supporting varying number of input bits may be used instead.

If soft bit information is available from the output of the interface 160, soft decoding may be used in a Viterbi-type decoder. Otherwise, hard decoding may need to be used. There may be (m+n) decoded bits from the decoder as seen in 311 in FIG. 3. From the first m bits, the third base station 121 obtains 312, 411, 511 which protected subframe pattern is used by the first group 151 of cells. From the last n bits and from knowing the identity of the sending base station, i.e. the identity of the first base station 111, the third base station 121 knows which first group 151 of base stations is associated to and is using the sent protected subframe pattern. If the UE 155 operates within an area with appreciable interference from the first base station 111 and/or from the second base station 112 the third base station 121 may schedule the UE 155 during the protected subframes as seen in 313 in FIG. 3.

If the 40-bit input to the interface 160 has to be the actual protected subframe pattern, an additional IE needs to be defined for a protocol for the interface 160 to carry the n-length index, as shown in the scheme in FIG. 4. This may be implemented in the same way as previous embodiments but with the ECGI or the common identifier of the first cell 131 and the second cell 132 replaced by the n-bit index or by including a list of cells for which the protected subframe is valid. Since n may be much smaller than the 28 bits of the ECGI for one cell, significant saving in signaling may be achieved if multiple ECGI identities may be replaced by one n-bit index.

If there is no need to send the respective first and second parameters over the interface 160 using a fixed format, e.g. the 40-bit format used over the X2 interface for sending the protected subframe patterns, only the (m+n) bits may be transmitted instead to reduce the traffic load on the interface 160. That is, for the scheme in FIG. 5, only the length-m vector for the protected subframe pattern and the n-bit index are transmitted from the first base station 111 to the third base station 121 over the interface 160.

Actions described above will be described below from a perspective of the first base station 111.

Figure 6:
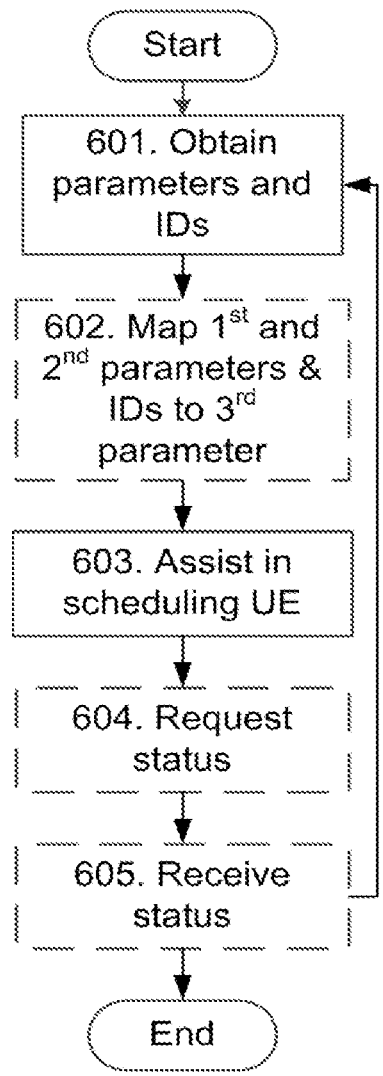
FIG. 6 is a flowchart depicting embodiments of a method in a first base station.

Examples of embodiments of a method in the first base station 111 for assisting the third base station 121 in scheduling of the user equipment 155 will now be described with reference to the flowchart depicted in FIG. 6. As mentioned above, the user equipment 155 is located in the third cell 141 served by the third base station 121. The third cell is at least partly overlapping with the first cell 131, served by the first base station 111, and with the second cell 132, served by the second base station 112. The first base station 111 and the third base station 121 may communicate with each other over the interface 160. The heterogeneous cellular communications network 100 may further comprise the further third base station 122, the further third cell 142 and the central processing node 170.

The method comprises the following actions, which actions may be taken in any suitable order. Dashed lines of some boxes in FIG. 6 indicate that this action is not mandatory.

Action 601

This action is related to action 202 above. In order for the first base station 111 to be able to assist the third base station 121 in the scheduling of the user equipment 155 the first base station 111 obtains a first parameter associated to the first cell 131. The first parameter comprises a first protected subframe pattern related to the heterogeneous cellular communications network 100. The first base station 111 further obtains an identifier of the first cell 131. The identifier will make it possible for the third base station 121 to identify the first cell 131 in which the first parameter is valid. In the cases where the first base station 111 serves more than one cell that are overlapping with the third cell 141 the first parameter may comprise parameters for multiple cells that are overlapping with the third cell 141.

The first base station 111 further obtains a second parameter associated to the second cell 132. The second parameter comprises a second protected subframe pattern related to the heterogeneous cellular communications network 100. The first base station 111 further obtains an identifier of the second cell 132. The identifier of the second cell 132 makes it possible for the third base station 121 to identify the second cell 132 in which the second parameter is valid.

Instead of obtaining the first parameter itself an indication of the first parameter may be obtained. Likewise, instead of obtaining the second parameter itself an indication of the second parameter may be obtained. This could for example be beneficial when only a small part of the available parameter space, such as the available protected subframe patterns, is actually used by the first and the second cells 111, 112.

The first parameter and the second parameter may be represented by a common parameter which is associated to both the first and the second cell 131, 132. A common parameter may be beneficial when the first parameter associated to the first cell 131 is equivalent to the second parameter associated to the second cell 132. By representing the first and the second parameters by a common parameter significant overhead reduction may be achieved on the interface 160.

The identifier of the first cell 131 and the identifier of the second cell 132 may be represented by a common identifier of the first and the second cell 131, 132, in order to reduce overhead.

In some embodiments the first base station 111 obtains a second common identifier of a multiple of third cells, such as the third cell 141 and the further third cell 142. This may be the case when the first cell 111 is assisting in scheduling of a multiple of user equipment in several third cells 141, 142. For example, in FIG. 1 both the first cell 131 and the second cell 132 are overlapping with both the third cells 141, 142.

As mentioned above usually only a small part of the available parameter space is used by the first and second base stations 111, 112. In order to reduce overhead on the interface 160 the indication of the common parameter may be represented by a binary vector.

In some embodiments the first base station 111 needs to synchronize the respective first and second protected subframe pattern with each other. Then the first parameter may further comprise an offset in a System Frame Number, SFN, for the first cell 131 with respect to a reference cell for the first and the second cell 131, 132 and the second parameter may further comprise an offset in an SFN for the second cell 132 with respect to the same reference cell. The reference cell may for example be the first cell 131.

The first parameter may further comprise a Relative Narrowband Tx Power, RNTP, indication for the first cell 131, and the second parameter may further comprise an RNTP for the second cell 132.

In some embodiments the first parameter, or the indication of the first parameter, and the second parameter, or the indication of the second parameter, and the identifier of the first cell 131 and the identifier of the second cell 132 are obtained from the central processing node 170.

Action 602

This action is related to action 203 above. As mentioned above, considerable reduction in overhead signaling may result from sending a respective indication of the respective first and/or second parameter instead of sending the parameter itself. In order to be able to take advantage of any redundancy in the parameter space the first base station may map the indication of the common parameter associated to both the first and the second cell 131, 132 and the common identifier representing the identifier of the first cell 131 and the identifier of the second cell 132 to a third parameter, whereby the third parameter is an indication of both the indication of the common parameter and the common identifier.

Action 603

The first base station 111 assists the third base station 121 in scheduling of the user equipment 155 by sending to the third base station 121 the first parameter, or the indication of the first parameter, associated to the first cell 131 and the identifier of the first cell 131, together with the second parameter, or the indication of the second parameter, associated to the second cell 132, and the identifier of the second cell 132. By sending the first parameter and the second parameter together the respective first and second parameter associated to the respective first and the second cell 131, 132 may take effect simultaneously in the third cell 141.

The first parameter, or the indication of the first parameter, and the identifier of the first cell 131 and the second parameter, or the indication of the second parameter and the identifier of the second cell 132 may be sent to the third base station 121 over an X2 interface 160.

Action 604

The first base station 111 may send a request to the third base station 121 for a status on the usage of the respective first and second protected subframes. Such a request may for example be implemented by a Resource Status Request in LTE.

Action 605

In some embodiments the first base station 111 received the status on the usage of the respective first and second protected subframes in response to the request sent in action 604. The reporting may be implemented by for example receiving a Resource Status Update message including an ABS Status IE in LTE.

Figure 7:
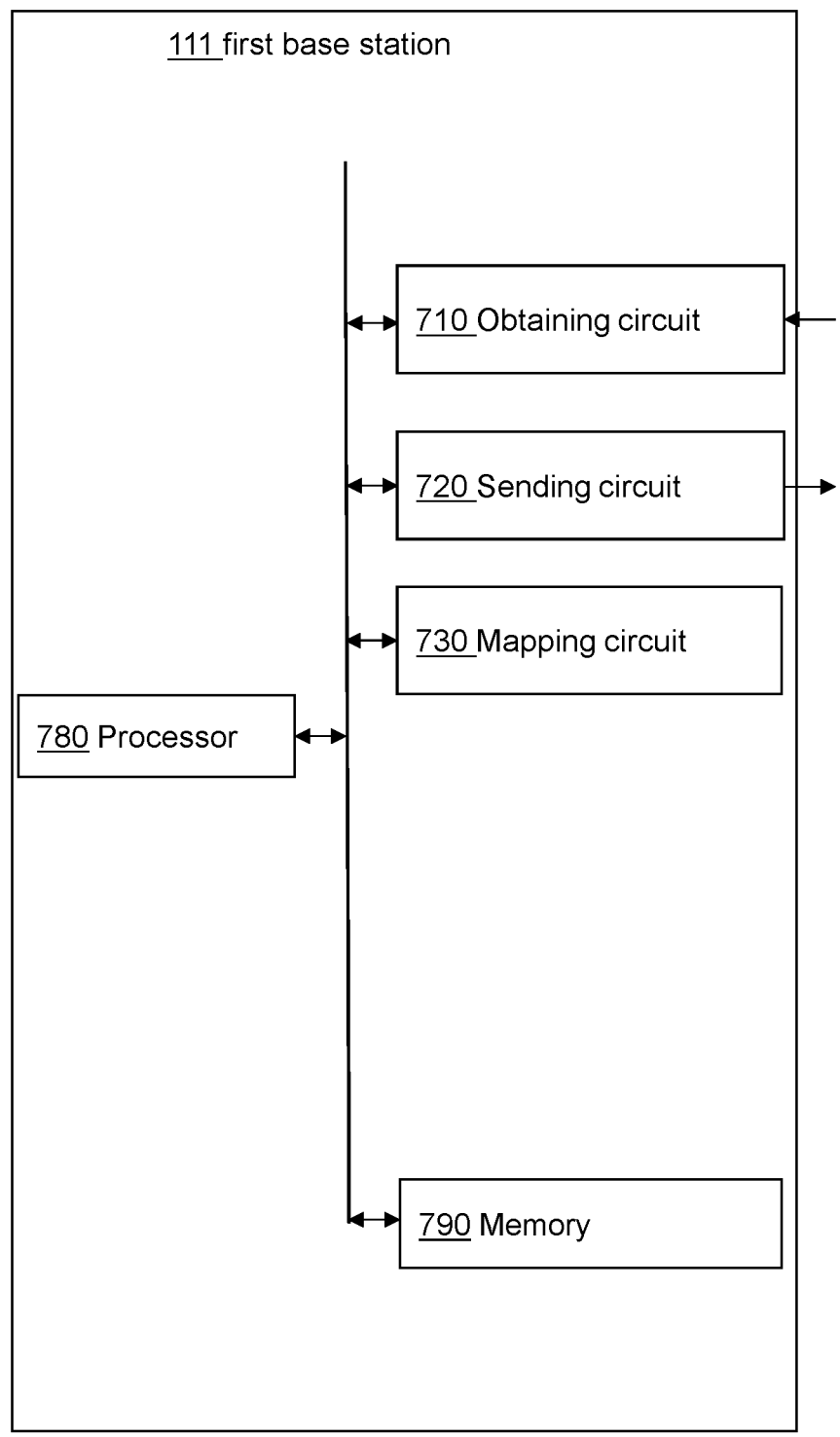
FIG. 7 is a schematic block diagram illustrating embodiments of a first base station.

To perform the method actions for assisting the third base station 121 in scheduling of the user equipment 155 in the heterogeneous cellular communications network 100 described above in relation to FIG. 6, the first base station 111 comprises the following arrangement depicted in FIG. 7.

As mentioned above, the user equipment 155 is arranged to be located in the third cell 141 served by the third base station 121. The third cell is arranged to at least partly overlap with the first cell 131 and with the second cell 132. The first base station 111 is operated to serve the first cell 131 and the second base station 112 is operated to serve the second cell 132. The first base station 111 and the third base station 121 may communicate with each other over the interface 160. The heterogeneous cellular communications network 100 may further be adapted to comprise the further third base station 122 and the further third cell 142. The heterogeneous cellular communications network 100 may further be adapted to comprise the central processing node 170.

The first base station 111 comprises an obtaining circuit 710 configured to obtain a first parameter associated to the first cell 131, or an indication of the first parameter, and an identifier of the first cell 131, which first parameter comprises a first protected subframe pattern related to the heterogeneous cellular communications network 100, and a second parameter associated to the second cell 132, or an indication of the second parameter, and an identifier of the second cell 132, which second parameter comprises a second protected subframe pattern related to the heterogeneous cellular communications network 100.

The obtaining circuit 710 may further be configured to obtain a common parameter associated to both the first cell 131 and the second cell 132.

The obtaining circuit 710 may further be configured to obtain a common identifier representing the identifier of the first cell 131 and the identifier of the second cell 132.

In some embodiments the obtaining circuit 710 further is configured to obtain a second common identifier for the third cell 141 and the further third cell 142.

The obtaining circuit 710 may further be configured to obtain a binary vector as an indication of the common parameter associated to both the first and the second cell 131, 132.

The first parameter may further comprise an offset in an SFN for the first cell 131 with respect to a reference cell for the first and the second cell 131, 132 and the second parameter may also further comprise an offset in an SFN for the second cell 132 with respect to the same reference cell. The reference cell may for example be the first cell 131.

In some embodiments the first parameter further comprises an RNTP indication for the first cell 131 and the second parameter further comprises an RNTP indication for the second cell 132.

The obtaining circuit 710 may further be configured to obtain the first parameter, or the indication of the first parameter, and the second parameter, or the indication of the second parameter, and the identifier of the first cell 131 and the identifier of the second cell 132 from the central processing node 170.

The first base station 111 further comprises a sending circuit 720 configured to assist the third base station 121 in scheduling of the user equipment 155 by sending to the third base station 121 the first parameter, or the indication of the first parameter, associated to the first cell 131 and the identifier of the first cell 131, together with the second parameter, or the indication of the second parameter, associated to the second cell 132, and the identifier of the second cell 132.

The sending circuit 720 may further be configured to send the first parameter, or the indication of the first parameter, and the second parameter, or the indication of the second parameter, and the identifier of the first cell 131 and the identifier of the second cell 132 to the third base station 121 over an X2 interface 160.

The first base station 111 may further comprise a mapping circuit 730 configured to map the indication of the common parameter associated to both the first and the second cell 131, 132 and a common identifier representing the identifier of the first cell 131 and the identifier of the second cell 132 to a third parameter, whereby the third parameter is an indication of both the indication of the common parameter and the identifier of the first group 153 of cells 131, 132.

The embodiments herein for assisting the third base station 121 in scheduling of the user equipment 155 may be implemented through one or more processors, such as a processor 780 in the first base station 111 depicted in FIG. 7, together with computer program code for performing the functions and actions of the embodiments herein. The program code mentioned above may also be provided as a computer program product, for instance in the form of a data carrier carrying computer program code for performing the embodiments herein when being loaded into the first base station 111. One such carrier may be in the form of a CD ROM disc. It is however feasible with other data carriers such as a memory stick. The computer program code may furthermore be provided as pure program code on a server and downloaded to the first base station 111.

The first base station 111 may further comprise a memory 790 comprising one or more memory units. The memory 790 is arranged to store information obtained from for example the second base station 112 and/or the third base station 121 and/or from the central processing node 170. Such information may be information about the first parameter and/or the second parameter and/or about the identities of the first cell 131, the second cell 132 and the third cell 141, etc. The memory 790 may also store configurations and applications to perform the methods herein when being executed in the first base station 111.

Those skilled in the art will also appreciate that the obtaining circuit 710, sending circuit 720 and mapping circuit 730 described above may refer to a combination of analog and digital circuits, and/or one or more processors configured with software and/or firmware, e.g. stored in a memory, that when executed by the one or more processors such as the processor 780 perform as described above. One or more of these processors, as well as the other digital hardware, may be included in a single application-specific integrated circuitry (ASIC), or several processors and various digital hardware may be distributed among several separate components, whether individually packaged or assembled into a system-on-a-chip (SoC).

Actions described above will be described below in more detail from a perspective of the third base station 121.

Figure 8:
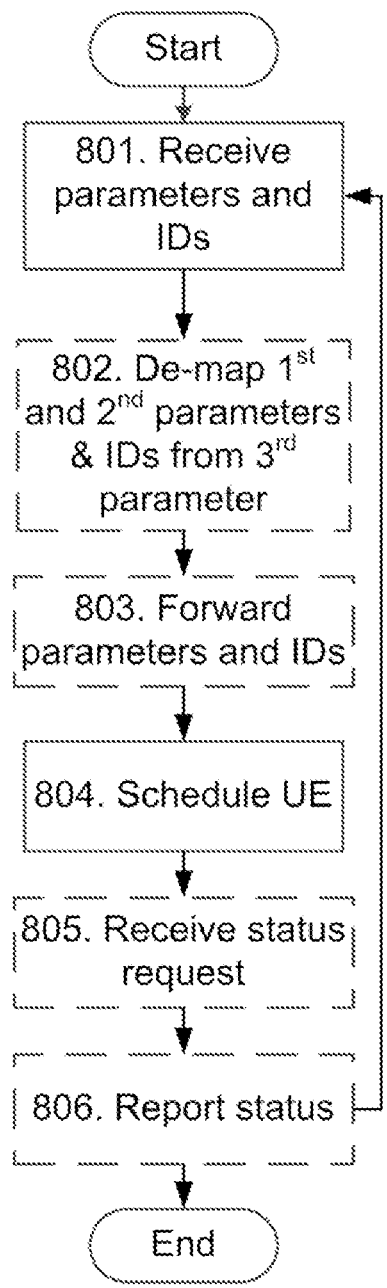
FIG. 8 is a flowchart depicting embodiments of a method in a third base station.

Examples of embodiments of a method in the third base station 121 for scheduling the user equipment 155 will now be described with reference to the flowchart depicted in FIG. 8. As mentioned above, the user equipment 155 is located in the third cell 141 served by the third base station 121. The third cell is at least partly overlapping with the first cell 131, served by the first base station 111, and with the second cell 132, served by the second base station 112. The first base station 111 and the third base station 121 may communicate with each other over the interface 160. The heterogeneous cellular communications network 100 may further comprise the further third base station 122, the further third cell 142 and the central processing node 170.

The method comprises the following actions, which actions may be taken in any suitable order. Dashed lines of some boxes in FIG. 8 indicate that this action is not mandatory.

Action 801

The third base station 121 receives a first parameter or an indication of the first parameter associated to the first cell 131 from the first base station 111. The first parameter comprises a first protected subframe pattern related to the scheduling of the user equipment 155 in the heterogeneous cellular communications network 100. The third base station 121 further receives an identifier of the first cell 131 in which the first parameter is valid from the first base station 111. Together with the first parameter, or the indication of the first parameter, and the identifier of the first cell 131 the third base station 121 receives a second parameter, or an indication of the second parameter, associated to the second cell 132 and an identifier of the second cell 132 from the first base station 111. The second parameter comprises a second protected subframe pattern related to the scheduling of the user equipment 155 in the heterogeneous cellular communications network 100.

In some embodiments the first parameter and the second parameter are represented by a common parameter which is associated with both the first cell 131 and the second cell 132. A common parameter may be beneficial for example when the first parameter associated to the first cell 131 is equivalent to the second parameter associated to the second cell 132.

The identifier of the first cell 131 and the identifier of the second cell 132 may be represented by a common identifier.

In some embodiments the indication of the common parameter is a binary vector. The first parameter may further comprise an offset in a System Frame Number, SFN, for the first cell 131 with respect to a reference cell for the first and the second cell 131, 132 and the second parameter may further comprise an offset in an SFN for the second cell 132 with respect to the same reference cell.

In some embodiments the first parameter further comprises a Relative Narrowband Tx Power, RNTP, indication for the first cell 131 and the second parameter further comprises an RNTP indication for the second cell 132.

The first parameter, or the indication of the first parameter, and the second parameter, or the indication of the second parameter, and the identifier of the first cell 131 and the identifier of the second cell 132 may be received over an X2 interface.

Action 802

In some embodiments the third base station 121 de-maps a third parameter to the indication of the common parameter and to the common identifier. The third parameter is an indication of both the indication of the common parameter and the common identifier.

Action 803

The third base station 121 may forward the first parameter, or the indication of the first parameter, and the identifier of the first cell 131 to the further third base station 122. The third base station 121 may further forward the second parameter, or the indication of the second parameter, and the identifier of the second cell 132 to the further third base station 122.

Action 804

The third base station 121 schedules the user equipment 155 based on the first parameter, or on the indication of the first parameter, and on the identifier of the first cell 131 and on the second parameter, or on the indication of the second parameter, and on the identifier of the second cell 132.

Action 805

The third base station 121 may receive a request for a status on the usage of the respective first and second protected subframes. Such a request may for example be implemented by a Resource Status Request in LTE.

Action 806

In some embodiments the third base station 121 reports the status on the usage of the respective first and second protected subframes to the first base station 111 in response to the request received in action 805. The reporting may be implemented by for example sending a Resource Status Update message including an ABS Status IE in LTE.

Figure 9:
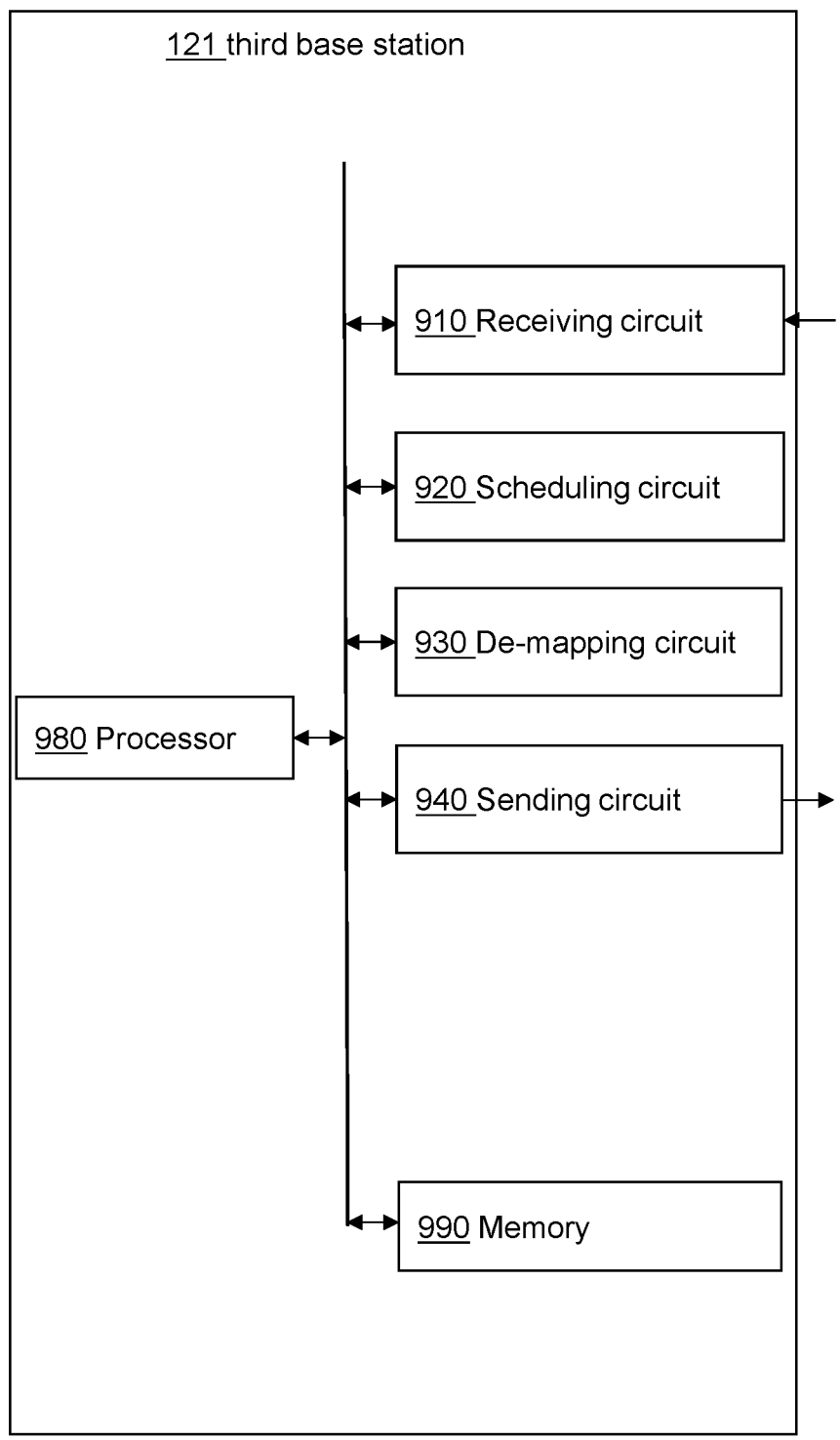
FIG. 9 is a schematic block diagram illustrating embodiments of a third base station.

To perform the method actions for scheduling the user equipment 155 in the heterogeneous cellular communications network 100 described above in relation to FIG. 8, the third base station 121 comprises the following arrangement depicted in FIG. 9.

As mentioned above, the user equipment 155 is arranged to be located in the third cell 141 served by the third base station 121. The third cell is arranged to at least partly overlap with the first cell 131 and with the second cell 132. The first base station 111 is operated to serve the first cell 131 and the second base station 112 is operated to serve the second cell 132. The first base station 111 and the third base station 121 may communicate with each other over the interface 160. The heterogeneous cellular communications network 100 may further be adapted to comprise the further third base station 122 and the further third cell 142. The heterogeneous cellular communications network 100 may further be adapted to comprise the central processing node 170.

The third base station 121 comprises a receiving circuit 910 configured to receive a first parameter or an indication of the first parameter associated to the first cell 131 from the first base station 111. The first parameter comprises a first protected subframe pattern related to the scheduling of the user equipment 155 in the heterogeneous cellular communications network 100. The receiving circuit 910 is further configured to receive an identifier of the first cell 131 in which the first parameter is valid from the first base station 111. The receiving circuit 910 is further configured to receive together with the first parameter, or the indication of the first parameter, and the identifier of the first cell 131 a second parameter, or an indication of the second parameter, associated to the second cell 132 and an identifier of the second cell 132 from the first base station 111. The second parameter comprises a second protected subframe pattern related to the scheduling of the user equipment 155 in the heterogeneous cellular communications network 100.

The receiving circuit may be configured to receive a common parameter, associated to both the first cell 131 and the second cell 132. A common parameter may be beneficial when the first parameter associated to the first cell 131 is equivalent to the second parameter associated to the second cell 132.

In some embodiments the receiving circuit 910 further is configured to receive a binary vector as the common parameter.

The receiving circuit 910 may further be configured to receive a common identifier of the first cell 131 and the second cell 132.

The first parameter may further comprise an offset in an SFN for the first cell 131 with respect to a reference cell for the first and the second cell 131, 132 and the second parameter may further comprise an offset in an SFN for the second cell 132 with respect to the same reference cell.

In some embodiments the first parameter further comprises an RNTP indication for the first cell 131, and the second parameter further comprises an RNTP indication for the second cell 132.

The receiving circuit 910 may further be configured to receive the first parameter, or the indication of the first parameter, and the second parameter, or the indication of the second parameter, and the identifier of the first cell 131 and the identifier of the second cell 132 over an X2 interface.

The third base station 121 further comprises a scheduling circuit 920 configured to schedule the user equipment 155 based on the first parameter, or on the indication of the first parameter, and on the identifier of the first cell 131 and on the second parameter, or on the indication of the second parameter, and on the identifier of the second cell 132.

In some embodiments the third base station 121 further comprises a de-mapping circuit 930 configured to de-map a third parameter to the indication of the common parameter and the common identifier, the third parameter being an indication of both the indication of the common parameter and the common identifier.

The third base station 121 may further comprise a sending circuit 940 configured to forward the first parameter, or the indication of the first parameter, and the identifier of the first cell 131 and/or the second parameter, or the indication of the second parameter, and the identifier of the second cell 132 to the further third base station 122.

The embodiments herein for scheduling the user equipment 155 may be implemented through one or more processors, such as a processor 980 in the third base station 121 depicted in FIG. 9, together with computer program code for performing the functions and actions of the embodiments herein. The program code mentioned above may also be provided as a computer program product, for instance in the form of a data carrier carrying computer program code for performing the embodiments herein when being loaded into the third base station 121. One such carrier may be in the form of a CD ROM disc. It is however feasible with other data carriers such as a memory stick. The computer program code may furthermore be provided as pure program code on a server and downloaded to the third base station 121.

The third base station 121 may further comprise a memory 990 comprising one or more memory units. The memory 990 is arranged to store information obtained from for example the first base station 121. Such information may be information about the first parameter and/or the second parameter and/or about the identities of the first cell 131 and/or the second cell 132, etc. The memory 990 may also store configurations and applications to perform the methods herein when being executed in the third base station 121.

Those skilled in the art will also appreciate that the receiving circuit 910, scheduling circuit 920, de-mapping circuit 930 and sending circuit 940 described above may refer to a combination of analog and digital circuits, and/or one or more processors configured with software and/or firmware, e.g. stored in a memory, that when executed by the one or more processors such as the processor 980 perform as described above. One or more of these processors, as well as the other digital hardware, may be included in a single application-specific integrated circuitry (ASIC), or several processors and various digital hardware may be distributed among several separate components, whether individually packaged or assembled into a system-on-a-chip (SoC).

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appending claims.

The invention claimed is:

1. A method in a first base station for assisting a third base station in scheduling of a user equipment in a third cell) in a heterogeneous cellular communications network, which heterogeneous cellular communications network comprises the first base station serving a first cell and a second base station serving a second cell, which the first cell and the second cell are both at least partly overlapping with the third cell served by the third base station comprised in the heterogeneous cellular communications network, the method comprising:

obtaining a first parameter associated to the first cell, or an indication of the first parameter, and an identifier of the first cell, which first parameter comprises a first protected subframe pattern related to the heterogeneous cellular communications network;

obtaining a second parameter associated to the second cell, or an indication of the second parameter, and an identifier of the second cell, which second parameter comprises a second protected subframe pattern related to the heterogeneous cellular communications network; and assisting the third base station in scheduling of the user equipment in the third cell by sending to the third base station:

the first parameter, or the indication of the first parameter, associated to the first cell and the identifier of the first cell, together with the second parameter, or the indication of the second parameter, associated to the second cell, and the identifier of the second cell.

2. The method according to claim 1, wherein the first parameter and the second parameter are represented by a common parameter which is associated to both the first cell and the second cell.

3. The method according to claim 1, wherein the identifier of the first cell and the identifier of the second cell are represented by a common identifier of the first and the second cell.

4. The method according to claim 2, wherein an indication of the common parameter is represented by a binary vector.

5. The method according to claim 3, further comprising:
mapping the indication of the common parameter associated to both the first cell and the second cell and the common identifier to a third parameter, whereby the third parameter is an indication of both the indication of the common parameter and the common identifier.

6. The method according to claim 1, wherein the first parameter further comprises an offset in a System Frame Number, SFN, for the first cell with respect to a reference cell for the first cell and the second cell, and wherein the second parameter further comprises an offset in an SFN for the second cell with respect to the same reference cell.

7. The method according to claim 1, wherein the first parameter further comprises a Relative Narrowband Tx Power, RNTP, indication for the first cell, and wherein the second parameter further comprises an RNTP indication for the second cell.

8. The method according to claim 1, wherein the first parameter, or the indication of the first parameter, and the identifier of the first cell and the second parameter, or the indication of the second parameter, and the identifier of the second cell are sent to the third base station over an X2 interface.

9. The method according to claim 1, wherein at least one or more of the first parameter, or the indication of the first parameter, and the second parameter, or the indication of the second parameter, and the identifier of the first cell and the identifier of the second cell are obtained from a central processing node.

10. A first base station for assisting a third base station in scheduling of a user equipment in a heterogeneous cellular communications network, which heterogeneous cellular communications network is adapted to comprise the first base station, which is operated to serve a first cell, a second base station, which is operated to serve a second cell, and a third base station, which is operated to serve a third cell, which third cell when served by the third base station is arranged to at least partly overlap with both the first cell and the second cell, the first base station comprising:

an obtaining circuit configured to obtain a first parameter associated to the first cell, or an indication of the first parameter, and an identifier of the first cell, which first parameter comprises a first protected subframe pattern related to the heterogeneous cellular communications network;

said obtaining circuit further configured to obtain a second parameter associated to the second cell, or an indication of the second parameter, and an identifier of the second cell, which second parameter comprises a second protected subframe pattern related to the heterogeneous cellular communications network; and the first base station further comprising a sending circuit configured to assist the third base station in scheduling of the user equipment by sending to the third base station:

the first parameter, or the indication of the first parameter, associated to the first cell and the identifier of the first cell, together with the second parameter, or the indication of the second parameter, associated to the second cell, and the identifier of the second cell.

11. The first base station according to claim 10, wherein the obtaining circuit further is configured to obtain a common parameter associated to both the first cell and the second cell.

12. The first base station according to claim 11, wherein the obtaining circuit further is configured to obtain a binary vector as an indication of the common parameter associated to both the first cell and the second cell.

13. The first base station according to claim 11, further comprising:

a mapping circuit configured to map the indication of the common parameter associated to both the first cell and the second cell and a common identifier representing the identifier of the first cell and the identifier of the second cell to a third parameter, wherein the third parameter is an indication of both the indication of the common parameter associated to both the first cell and the second cell and the common identifier representing the identifier of the first cell and the identifier of the second cell.

14. A method in a third base station for scheduling a user equipment in a heterogeneous cellular communications network, which heterogeneous cellular communications network further comprises a first base station serving a first cell and a second base station serving a second cell, which first cell and second cell are both at least partly overlapping with a third cell served by the third base station comprised in the heterogeneous cellular communications network, the method comprising:

transmitting to the first base station a request for: (i) a first protected subframe pattern used the first cell and (ii) a second protected subframe pattern used by the second cell;

in response to the request, receiving from the first base station:

a first parameter or an indication of the first parameter associated to the first cell, and an identifier of the first cell, which first parameter comprises the first protected subframe pattern related to the scheduling of the user equipment in the heterogeneous cellular communications network, together with a second parameter, or an indication of the second parameter associated to the second cell, and an identifier of the second cell, which second parameter comprises the second protected subframe pattern related to the scheduling of the user equipment in the heterogeneous cellular communications network; and scheduling the user equipment based on the first parameter, or on the indication of the first parameter, and on the identifier of the first cell and on the second parameter, or on the indication of the second parameter, and on the identifier of the second cell.

15. The method according to claim 14, wherein the first parameter and the second parameter are represented by a common parameter which is associated to both the first cell and the second cell.

16. The method according to claim 14, wherein the identifier of the first cell and the identifier of the second cell are represented by a common identifier.

17. The method according to claim 15, wherein an indication of the common parameter associated to both the first cell and the second cell is a binary vector.

18. The method according to claim 16, further comprising:
 de-mapping a third parameter to the indication of the common parameter associated to both the first cell and the second cell and to the common identifier, the third parameter being an indication of both the indication of the common parameter and the common identifier.

19. The method according to claim 14, further comprising:
 forwarding one or more of:
  the first parameter, or the indication of the first parameter, and the identifier of the first cell; and
  the second parameter, or the indication of the second parameter, and the identifier of the second cell to a further third base station.

20. The method according to claim 14, wherein the first parameter further comprises an offset in a System Frame Number, SFN, for the first cell with respect to a reference cell for the first cell and the second cell, and wherein the second parameter further comprises an offset in an SFN for the second cell with respect to the same reference cell.

21. The method according to claim 14, wherein the first parameter further comprises a Relative Narrowband Tx Power, RNTP, indication for the first cell, and wherein the second parameter further comprises an RNTP indication for the second cell.

22. The method according to claim 14, wherein the first parameter, or the indication of the first parameter, and the and the second parameter, or the indication of the second parameter, and the identifier of the first cell and the identifier of the second cell are received over an X2 interface.

23. A third base station for scheduling a user equipment in a heterogeneous cellular communications network, which heterogeneous cellular communications network is adapted to comprise a first base station, which is operated to serve a first cell, a second base station, which is operated to serve a second cell, and the third base station, which is operated to serve a third cell, which third cell when served by the third base station is arranged to at least partly overlap with both the first cell and the second cell, the third base station comprising:
 a sending circuit configured to transmit to the first base station a request for: (i) a first protected subframe pattern used by the first cell and (ii) a second protected subframe pattern used by the second cell;
 a receiving circuit configured to receive from the first base station in response to the request:
  a first parameter or an indication of the first parameter associated to the first cell, and an identifier of the first cell, which first parameter comprises the first protected subframe pattern related to the scheduling of the user equipment in the heterogeneous cellular communications network, together with
  a second parameter, or an indication of the second parameter associated to the second cell, and an identifier of the second cell, which second parameter comprises the second protected subframe pattern related to the scheduling of the user equipment in the heterogeneous cellular communications network; and
 the third base station further comprising a scheduling circuit configured to schedule the user equipment based on the first parameter, or on the indication of the first parameter, and on the identifier of the first cell and on the second parameter, or on the indication of the second parameter, and on the identifier of the second cell.

24. The third base station according to claim 1, further comprising:
 a de-mapping circuit configured to de-map a third parameter to an indication of a common parameter associated to both the first cell and the second cell and to a common identifier of the first cell and the second cell, the third parameter being an indication of both the indication of the common parameter and the common identifier.

25. The third base station according to claim 23, the sending circuit further configured to forward one or more of:
 the first parameter, or the indication of the first parameter, and the identifier of the first cell; and
 the second parameter, or the indication of the second parameter, and the identifier of the second cell to a further third base station.

* * * * *